United States Patent Office 3,842,121
Patented Oct. 15, 1974

3,842,121
CATALYST FOR REDUCTION OF CARBON MONOXIDE
Masaru Ichikawa, Tokorozawa, Shuichi Naito and Kohei Kawase, Sagamihara, and Kenzi Tamaru, Kamakura, Japan, assignors to Sagami Chemical Research Center, Tokyo, Japan
No Drawing. Original application Sept. 29, 1971, Ser. No. 184,907, now abandoned. Divided and this application Feb. 20, 1973, Ser. No. 333,720
Claims priority, application Japan, Oct. 2, 1970, 45/85,896; Dec. 11, 1970, 45/109,362
Int. Cl. C07c 27/06, 1/04
U.S. Cl. 260—449 R          7 Claims

ABSTRACT OF THE DISCLOSURE

A catalyst capable of converting carbon monoxide into hydrocarbons is disclosed, said catalyst comprises at least one alkali metal belonging to Group Ia of the Periodic Table, graphite and at least one halide of a transition metal selected from the group consisting of Groups IVB, VB, VIB, VIIB and VIII of the Periodic Table.

---

This is a division of application Ser. No. 184,907, filed Sept. 29, 1971, and now abandoned.

This invention relates to a catalyst suitable for use in reduction of carbon monoxide. More particularly, this invention relates to a catalyst capable of synthesizing various hydrocarbons from a mixture of hydrogen and carbon monoxide and the catalyst comprises at least one alkali metal, graphite and at least one halide of a transition metal selected from the group consisting of Groups IVB, VB, VIB, VIIB and VIII of the Periodic Table.

In one of the prior art methods a mixture of carbon monoxide and hydrogen is contacted with a catalyst of nickel, cobalt or iron supported on alumina or diatomaceous earth at a temperature of 200° to 300° C. and under a pressure of 100 atmospheric pressure to produce a liquid hydrocarbon (F. Fischer and H. Tropsch, Brennstoff Chem. 7, 97 (1926), and R. B. Anderson, Adv. in Catalysis V, 355 (1933)). In this method, it is important to add a basic compound as promoter to the catalyst system in order to enhance the catalytic activity and improve the selectivity to a higher hydrocarbon. However, such catalyst has an inherent disadvantage in that the life of the catalyst depends upon the partial pressure of carbon monoxide and, therefore, critical control of reaction conditions is required.

The catalyst according to this invention is novel and its constituents are entirely different from those of prior art. By use of the catalyst according to this invention, it is possible to carry out the reduction of carbon monoxide at a normal temperature and pressure, and to obtain a $C_2$ hydrocarbon, such as ethylene and ethane, in high conversion. The catalyst is not adversely affected by oxygen and the sulfur compounds in the synthesis gas and a reduction treatment is not necessary.

The catalyst according to this invention is a complex compound comprising (a) at least one alkali metal belonging to Group Ia of the Periodic Table, (b) at least one halide of a transition metal selected from the group consisting of Groups IVB, VB, VIB, VIIB and VIII of the Periodic Table and (c) graphite. The preferred transition metal halide is the chloride thereof.

This complex compound comprises an alkali metal as an electron donor, graphite as an electron acceptor, which contains a transition metal halide in an appropriate amount. Thus, such complex compound is generally called "an electron donor-acceptor complex."

The catalyst according to this invention can be produced by means of (1) subjecting a mixture of graphite and a transition metal halide to a heat treatment at a temperature of from about 250 to 500° C. for about 5 to 20 hours to form a graphite-transition metal halide interlayer complex, (2) adding an alkali metal to the interlayer complex and thereafter (3) heating the mixture under reduced pressure, for example less than $10^{-1}$ cm. Hg, preferably less than $10^{-3}$ cm. Hg, or in an inert gas atmosphere such as argon and nitrogen, at a temperature above the melting point of the alkali metal.

In the catalyst, the weight ratio of the transition metal compound to graphite is generally about 0.001–10:1, preferably 0.01–1.0:1, and the weight ratio of alkali metal to graphite-transition metal halide interlayer complex is generally about 0.1–10:1 and preferably 0.5–1.0:1. The graphite employed for preparation of the catalyst can be produced by pyrolysis of a carbon-containing material, such as coal pitch coke and petroleum pitch coke, or a gaseous hydrocarbon such as methane and ethane, and carbon. The preferred graphite is produced by pyrolysis of active carbon.

The catalyst according to this invention shows a remarkable absorption of hydrogen and carbon monoxide. Hence, when a mixture of these gases is contacted with the catalyst there is observed the formation of $C_1$–$C_5$ hydrocarbons, especially $C_2$ hydrocarbons, such as ethylene and ethane in a high selectivity. Further, it is possible to produce ammonia and hydrocarbons simultaneously from carbon monoxide and air.

If any one or two of (a) an alkali metal, (b) transition metal halide and (c) graphite are employed individually or in combination as catalyst ingredients, the formation of hydrocarbon is extremely low. In contrast, the three-component catalyst of this invention is able to increase the formation of hydrocarbon by ten times and the kind and proportion of hydrocarbons produced may vary depending upon the kind of transition metal employed as catalyst ingredient.

The reduction of carbon monoxide using the catalyst according to this invention is generally carried out at a temperature of from room temperature to 500° C., preferably 250° to 400° C. under a reduced to superatmospheric pressure at a space velocity of 100–20,000 v./v.-hr. through recirculating or passing-through system. The product is entrapped in suitable trapping means, such as a cooler or condenser.

This invention will be further explained in detail by means of examples; however it should be understood that examples are given only for the purpose of illustration and are not intended to limit the scope of this invention.

EXAMPLE 1

In a 300 cc. U-shaped glass reactor, graphite and a transition metal halide were heated at 300° C. in vacuo ($10^{-3}$ mm. Hg) to form graphite-transition metal halide interlayer complex, followed by adding metallic potassium and subjecting to heat treatment under the same conditions to form a three-component catalyst of graphite-transition metal halide-potassium. The surface area of the catalyst was measured according to BET method and found to be about 20 m.$^2$/g.

A mixture of hydrogen and carbon monoxide was circulated at a rate of 15 cc./min. in the reactor containing the catalyst. Hydrocarbons entrapped in the condenser were subjected to quantitative and qualitative analysis by means of chromatography and infra-red spectroscopy.

When oxygen was present in an amount corresponding to a partial presusre of 10–20 cm. Hg in the synthesis gas, no decrease in catalytic activity was observed.

The reaction conditions and the results are given in Table 1.

TABLE 1

| Catalyst | | | Partial pressure of gas (cm. Hg) | | Reaction temp. (°C.) | Amount of hydrocarbons produced after 20 hrs. (cc.) | Proportion of hydrocarbons (molar percent) | | | | | |
|---|---|---|---|---|---|---|---|---|---|---|---|---|
| Transition metal halide | Graphite | K | CO | $H_2$ | | | $C_1$ | $C_2$ | $C_3$ | $C_4$ | $C_5$ | Benzene |
| FeCl₃ (0.2 gr.) | (2 gr.) | (2 gr.) | 10 | 40 | 150 | 1 | 27 | 72 | 1 | 0 | 0 | 0 |
|  | (2 gr.) | (2 gr.) | 10 | 40 | 200 | 4 | 26 | 69 | 4 | 1 | 0 | 0 |
|  |  |  | 10 | 40 | 300 | 26 | 4 | 89 | 4 | 3 | 0 | 0 |
| RuCl₃ (0.6 gr.) | (2 gr.) | (2 gr.) | 10 | 40 | 300 | 17 | 4 | 78 | 10 | 8 | 0 | 0 |
| OsCl₃ (0.6 gr.) | (2 gr.) | (2 gr.) | 10 | 40 | 300 | 32 | 3 | 82 | 8 | 2 | 1 | 1 |
| WCl₆ (0.2 gr.) | (2 gr.) | (2 gr.) | 10 | 40 | 300 | 28 | 2 | 84 | 9 | 2 | 1 | 2 |
| MoCl₅ (0.2 gr.) | (2 gr.) | (2 gr.) | 10 | 40 | 300 | 34 | 5 | 87 | 4 | 1 | 1 | 2 |
| RhCl₃ (0.6 gr.) | (2 gr.) | (2 gr.) | 10 | 40 | 300 | 6 | 4 | 86 | 9 | 1 | 0 | 0 |
| RtCl₄ (0.2 gr.) | (2 gr.) | (2 gr.) | 15 | 40 | 300 | 22.2 | 6 | 90 | 3 | 1 | 0 | 0 |
| VCl₃ (1 gr.) | (2 gr.) | (2 gr.) | 10 | 40 | 300 | 3 | 8 | 76 | 10 | 6 | 0 | 0 |
| NiCl₂ (0.2 gr.) | (2 gr.) | (2 gr.) | 10 | 45 | 300 | 37.8 | 5 | 90 | 3 | 2 | 0 | 0 |
| PdCl₂ (1 gr.) | (2 gr.) | (2 gr.) | 15 | 40 | 300 | 28.5 | 9 | 88 | 2 | 1 | 0 | 0 |

NOTE.—$C_1$: Methane; $C_2$: $C_2H_4 + C_2H_6$; $C_3$: $C_3H_6 + C_3H_8$; $C_4$: $C_4H_8 + C_4H_{10}$; $C_5$: $C_5H_{12}$.

EXAMPLE 2

The procedures in Example 1 were repeated using two or three alkali metals, tungsten chloride and graphite to prepare a catalyst with which a mixture of hydrogen and carbon monoxide was contacted, the surface area of the catalyst being about 20 m.²/g. The reaction conditions and results are given in Table 2.

TABLE 2

| Catalyst | Partial pressure of gas (cm. Hg) | | Reaction temp. (°C.) | Amount of hydrocarbons produced after 20 hrs. (cc.) | Proportion of hydrocarbons (molar percent) | | | | |
|---|---|---|---|---|---|---|---|---|---|
| | CO | $H_2$ | | | $C_1$ | $C_2$ | $C_3$ | $C_4$ | $C_5$ |
| K(2 gr.)-G(2 gr.) | 10 | 40 | 300 | 1.2 | 2 | 24 | 22 | 2 | 0 |
| WCl₆(0.2 gr.)-G(2 gr.) | 10 | 40 | 300 | 0 | | | | | |
| WCl₆(1.0 gr.)-K(2 gr.)-G(2 gr.) | 10 | 40 | 300 | 20 | 4 | 82 | 8 | 4 | 1 |
| WCl₆(0.2 gr.)-Na(2 gr.)-G | 10 | 40 | 300 | 38 | 12 | 80 | 6 | 2 | 1 |
| WCl₆(0.2 gr.)-Rb(1 gr.)-G(1 gr.) | 10 | 40 | 300 | 18 | 2 | 87 | 8 | 2 | 2 |

NOTE.—G=Graphite.

EXAMPLE 3

The catalysts prepared in Example 1 were used and various mixtures of hydrogen, carbon monoxide and air or nitrogen were converted into ammonia and hydrocarbons.

The results are given in Table 3 from which it is observed that the presence of nitrogen and air does not adversely affect the formation of hydrocarbons.

drocarbons entrapped in cooler were subjected to gas chromatography and infrared analysis.

When 10–20 cm. Hg of oxygen was present in the synthesis gas, the catalytic activity did not decrease.

The reaction conditions and the results are given in Table 4 which also includes a two-component catalyst of graphite and metallic potassium for comparison.

TABLE 4

| Catalyst | Partial pressure of gas (cm. Hg.) | | Reaction temp. (°C.) | Reaction time (hr.) | Amount of hydrocarbons produced (cc.) | Proportion of hydrocarbons (molar percent) | | | | |
|---|---|---|---|---|---|---|---|---|---|---|
| | CO | $H_2$ | | | | $C_1$ | $C_2$ | $C_3$ | $C_4$ | $C_5$ |
| G (2 gr.)-K (2 gr.) | 10 | 40 | 300 | 20 | 1.2 | 2 | 74 | 22 | 2 | 0 |
| CoCl₂ (1 gr.)-G (2 gr.)-K (2 gr.) | 30 | 30 | 300 | 22 | 49.8 | 5 | 91 | 3 | 1 | 0 |

TABLE 3

| Catalyst | Partial pressure of gas (cm. Hg) | Reaction temperature (°C.) | Amount of product after 20 hrs. (cc.) | |
|---|---|---|---|---|
| | | | $NH_3$ | Hydrocarbon |
| FeCl₃(0.2 gr.)-G (2 gr.)-K (2 gr.) | Air, 10; CO, 10; $H_2$, 40 | 300 | 18 | 20 |
|  | $N_2$, 10; CO, 10; $H_2$, 40 | 300 | 21 | 16 |
| WCl₆ (0.2 gr.)-G (2 gr.)-K (2 gr.) | Air, 10; CO, 10; $H_2$, 40 | 300 | 0.01 | 30 |

EXAMPLE 4

A three-component catalyst was prepared in a 300 cc. glass U-shaped reactor by heating graphite and cobalt chloride at 300° C. and under a pressure of 10⁻³ mm. Hg to form graphite-cobalt chloride interlayer complex, then metallic potassium was added and heated under the same conditions to prepare a three-component catalyst. The surface area of the catalyst was about 20 m.²/g. A mixture of hydrogen and carbon monoxide was circulated in the reactor containing the catalyst at a rate of 15 cc./mm. Hy-

EXAMPLE 5

According to the procedures of Example 4, an alkali metal, a transition metal halide and graphite were employed for preparing catalyst and a mixture of hydrogen and carbon monoxide was contacted with the catalyst. The surface area of catalyst was about 20 m.$^2$/g. The reaction conditions and the results are given in Table 5.

melting point of said alkali metal under a reduced pressure of less than 10$^{-3}$ cm. Hg.

TABLE 5

| Catalyst | Partial pressure of gas (cm. Hg.) | | Reaction temp. (° C.) | Reaction time (hr.) | Amount of hydrocarbons produced (cc.) | Proportion of hydrocarbons (molar percent) | | | | |
|---|---|---|---|---|---|---|---|---|---|---|
| | CO | H$_2$ | | | | C$_1$ | C$_2$ | C$_3$ | C$_4$ | C$_5$ |
| RhCl$_3$(0.6 gr.)-G(2 gr.)-K(2 gr.) | 10 | 40 | 300 | 20 | 6 | 4 | 86 | 9 | 1 | |
| IrCl$_3$(0.5 gr.)-G(2 gr.)-K(2 gr.) | 30 | 30 | 300 | 22.5 | 7.1 | 7 | 90.5 | 0.9 | 0.6 | |
| ReCl$_3$(0.5 gr.)-G(2 gr.)-K(2 gr.) | 30 | 30 | 270 | 24 | 9.4 | 3 | 95 | 2 | | |
| ZrCl$_4$(0.5 gr.)-G(2 gr.)-K(2 gr.) | 29.2 | 30.8 | 300 | 6 | 8.3 | 4 | 86 | 10 | | |
| TiCl$_4$(0.6 gr.)-G(2 gr.)-Na(2 gr.) | 30 | 30 | 300 | 6 | 8.5 | 3 | 87 | 10 | | |

We claim:
1. In the synthesis of hydrocarbons by reaction of carbon monoxide and hydrogen in the presence of a catalyst, the improvement which comprises conducting said reaction at a temperature of from 250° C. to 400° C. in the presence of an electron donor-acceptor complex catalyst consisting essentially of
   (a) an alkali metal,
   (b) graphite, and
   (c) a chloride of a transition metal selected from the group consisting of Groups IVB, VB, VIB, VIIB and VIII of the Periodic Table, and
wherein the weight ratio of said chloride to graphite is a 0.001–10:1 and of said alkali metal to graphite and chloride is 0.1–10:1.

2. The synthesis of Claim 1, wherein the weight ratio of said chloride to graphite is 0.01–1.0:1 and of said alkali metal to graphite and chloride is 0.5–1.0:1.

3. The synthesis of Claim 1, wherein the alkali metal is sodium, potassium or rubidium.

4. The synthesis of Claim 1, wherein said complex is formed by
   heating a mixture of graphite and said chloride at a temperature of from about 200° C. to 500° C. to form a graphite-chloride interlayer complex,
   adding said alkali metal to said interlayer complex, and heating the resulting mixture at a temperature above the melting point of said alkali metal under a reduced pressure of less than 10$^{-3}$ cm. Hg.

5. The synthesis of Claim 1, wherein said reaction is conducted under a reduced pressure to a superatomspheric pressure.

6. The synthesis of Claim 1, wherein said reaction is conducted with a space velocity of 100–20,000 v./v.-hr.

7. The synthesis of Claim 1, wherein said complex is formed by
   heating a mixture of graphite and said chloride at a temperature of from about 200° C. to 500° C. to form a graphite-chloride interlayer complex, adding said alkali metal to said interlayer complex, and
   heating the resulting mixture at a temperature above the melting point of said alkali metal in an inert gas atmosphere.

References Cited
UNITED STATES PATENTS

| 2,692,274 | 10/1954 | Kolbel et al. | 260—449.6 |
| 2,660,598 | 11/1953 | Hoffert | 260—449 |
| 1,909,442 | 5/1933 | Williams | 260—449 M |
| 2,564,696 | 8/1951 | Keith et al. | 260—449.6 |

HOWARD T. MARS, Primary Examiner

U.S. Cl. X.R.

260—449 M, 449.6 R; 252—441, 447, 474, 476